United States Patent [19]
Corey et al.

[11] 3,812,268

[45] May 21, 1974

[54] COMPRESSED COMPOUNDED FOOD PRODUCT AND METHOD OF MAKING SAME

[75] Inventors: Harold Corey, Teaneck; Abraham Bakal, Rockaway; Kurt Konigsbacher, Short Hills; Daniel Schoenholz, Basking Ridge, all of N.J.

[73] Assignee: Foster D. Snell, Inc., Florham Park, N.J.

[22] Filed: June 29, 1973

[21] Appl. No.: 374,899

Related U.S. Application Data

[63] Continuation-in-part of Ser. No. 168,499, Aug. 2, 1971.

[52] U.S. Cl............... 426/146, 426/212, 426/370, 426/371, 426/372
[51] Int. Cl..................... A22c 18/00, A22c 25/00
[58] Field of Search .......... 426/145, 146, 147, 212, 426/364, 370, 371, 372

[56] References Cited
UNITED STATES PATENTS

| | | | |
|---|---|---|---|
| 3,202,514 | 8/1965 | Burgess et al.................. | 426/364 X |
| 3,431,112 | 3/1969 | Durst............................. | 426/364 X |
| 3,653,908 | 4/1972 | Buck et al...................... | 426/364 X |

Primary Examiner—Hyman Lord
Attorney, Agent, or Firm—Mason, Kolehmainen, Rathburn & Wyss

[57] ABSTRACT

Compounded food products containing a relatively high (at least 18 percent by weight) vegetable protein content and at least 10 percent by weight of an edible polyhydric alcohol are prepared in the form of a doughy mass which is cooked or baked, dried to a moisture content of 4–8 percent, then compressed to 20–80 percent of the original volume and dried to a moisture content of 3 percent or less. Such food products can be stored at ordinary temperature if protected from moisture or under refrigeration for long periods of time. On admixture with aqueous liquids they recover their original volume, geometry and structure.

10 Claims, No Drawings

COMPRESSED COMPOUNDED FOOD PRODUCT AND METHOD OF MAKING SAME

CROSS-REFERENCE TO PENDING APPLICATION

This application is a continuation-in-part of our co-pending application Ser. No. 168,499, filed Aug. 2, 1971 now abandoned.

This invention relates to compounded food products which are so designed and fabricated as to be in open, cellular, or vented form, thus adapted to be compressed to a fraction of their original volume and capable of returning to their original volume, shape and form upon exposure to a humid environment or immersion in a suitable liquid.

More particularly this invention relates to the composition of ingredients used in compounding the product as well as to the process by which the vented or cellular product is made and the conditions required for successful compression.

BACKGROUND OF THE INVENTION

Compressed natural foods have been known for many years. Typical examples are vegetables, such as peas, which are freeze-dried and compressed to a relatively small volume, and which on admixture with water swell to approximately their original form in size and shape. Compounded foods, however, in contrast with natural foods pose some problems regarding the retaining of structure after admixture with liquid. Usually, such materials, when wetted with excess of water, form mushes or slurries which in no way resemble the original food. For example, bread in dried compressed form has been made, but on admixture with water, the product does not retain its structure but rather forms a mush unless the amount of liquid available to the product is carefully controlled.

It is the object of this invention to provide compounded food products which can be compressed to a small fraction of their original volume and which on admixture with water or other liquid will swell to a volume, size, and structure resembling the original.

It is another object of this invention to provide compositions of the essential ingredients.

A further object is to provide a process for the formation of these products.

Another object is to provide products of the foregoing nature which contain a high percentage of protein and low percentage of fat and carbohydrates, although foods high in carbohydrate and fat can be made with the same technique.

GENERAL DESCRIPTION OF THE INVENTION

We have discovered that compounded food products, especially suited for compression, may be produced from a dry mix of ingredients comprised of at least 18 percent gluten or other vegetable protein and a relatively high percentage of a polyhydric alcohol (at least 10 percent), the percentages being calculated on the total weight of the product. When this mixture is mixed with water to produce a doughy mass which is baked and dried in the process that is described herein, an open cellular product is obtained having a density of 12 lb/ft$^3$ or more, depending on the relative ratio of the ingredients and the processing conditions employed. Usually such products have densities of 10 to 40 lbs/ft$^3$.

Such products after being compressed to a small fraction of their original volume will recover their original volume, geometry, and structure upon being immersed in water or other suitable liquid, or upon being moistened with any of these liquids and then heated in an oven at a suitable temperature above ambient, or, if the formulations contain a suitable amount of hard fat or other solid but meltable plasticizer, upon heating in an oven as above. Such food products are particularly advantageous for pet foods, for foods for military and space operations and for rations in any situation where small volume is important or where the expansion mechanism may be advantageous.

A typical production of such products is carried out by mixing the ingredients with appropriate amounts of water to produce a doughy mass. Depending on the desired final shape the dough is cut into pieces or forms and baked in an oven or cooked, thus causing expansion of the system as well as a locking-in of the structure. In this manner, a sponge type structure is obtained. The density of the product can be controlled by the baking temperature, the aeration given to the dough prior to baking and the presence of leavening agents, if any, or by controlling the pressure upon the product during baking. Thereafter, the baked or cooked product is dried by any suitable dehydration method (air-drying, freeze drying, vacuum air drying, etc.) to a moisture content of 4 to 8 percent by weight. This level of moisture is a key factor for successful compression of the product. Too low moisture content results in shattering and cracking during compression, while too high moisture content results in permanent deformation or even flow of the product under compression. The compression pressure (2,000 to 5,000 psig) results in a 20–80 percent reduction of the original volume. The compressed product is then locked into this compressed state by drying to a moisture content of 2 percent or less. Such food products can be stored at ordinary temperature or under refrigeration if protected from moisture, or in the frozen state for prolonged periods of time.

The key to the structural fidelity and the behavior of these products is associated with the relatively high vegetable protein content as exemplified by gluten, soybean protein and the like. Also animal proteins can be incorporated in the products in lieu of gluten, such as albumin, collagen, gelatin and whey. These materials are composed of high molecular weight molecules existing in long chains which become intermeshed in random distribution to form a web or interlaced network of crossed fibers which provide structural fidelity to the compressed food product and enable it to return to its original geometry and size. Also essential in the food products is a plasticizer such as a polyhydric alcohol, such as glycerol, propylene glycol, mannitol or sorbitol, which serve as a plasticizer for the protein molecules and enable them to be compressed and yet return to their original symmetry and form on admixture with water. The polyhydric alcohol must, of course, be water-soluble and edible. Other plasticizers can be used in baked products which are insoluble in water, such as edible mono- and di-glycerides; for example, glycerol monostearate and distearate.

DETAILED DESCRIPTION OF THE INVENTION

In the practice of the invention, a natural food product such as meat, fish, fruit, vegetable, and the like, is shredded and dispersed within the framework of the protein and polyhydric alcohol components. The meat is usually shredded and homogenized with a water-suspension of the protein containing the polyhydric alcohol. The resulting product is of a doughy consistency which can be whipped or aerated with mechanical equipment to introduce voids containing air, or it can be leavened with a leavening agent such as baking powder. The product is then shaped into desired form and cooked or baked. Thereafter, the cooked or baked product is air-dried to a low moisture content. The moisture content can be thereafter adjusted to less than 5 percent by weight (by humidification if necessary) and then the product is compressed at high pressures (1,000 to 4,000 psi). The compression step results in a reduction to 10–50 percent of the original volume. The compressed product is then dried to a moisture content not greater than 3 percent, preferably not greater than 2 percent. Such food products can be stored at ordinary temperature if protected from moisture, or under refrigeration conditions or in the frozen state, or prolonged periods of time.

Baked goods can also be comminuted and dispersed with water-insoluble plasticizers such as edible mono- and tri-glycerides to form doughy materials which can thereafter be dried and compressed. Included are bread, pastry, puddings, cakes and doughnuts.

The invention is disclosed in further detail by means of the following examples which are provided for purposes of illustration only.

EXAMPLE 1

Compressed beef was produced from the following:

| Component | % (Weight) |
| --- | --- |
| Gluten | 15 |
| Soy protein (Promine D) | 11 |
| Propylene glycol | 7 |
| Beef steak | 10 |
| Water | 57 |

The beef steak was fried and then ground in a meat grinder. It was dispersed in water in a Waring blender. Then with continuous mixing the propylene glycol was added, followed by the gluten (wetted with alcohol) and the soy protein. The entire dough mix was kneaded for approximately 5 minutes and shaped into the desired form, and left to relax for approximately 15 minutes. The specimens were then baked in a preheated oven at 350° F. for 2 hours. They were removed and air-dried with moisture level of not more than 2 percent by weight. To facilitate drying in some cases, the outer cooked layer of the baked product was removed. The dried specimens were then rehumidified in a steam environment to a moisture level of 4.5 percent. They were then compressed under a pressure of 2,000 psi., resulting in a three to one size reduction. The products were then air-dried at room temperature to a moisture content not greater than 2 percent.

The food products thus prepared could be stored at room temperature for an indefinite period. They were reconstituted by immersion in cold water and in hot water, each specimen expanding to its original size and form. The time required for full expansion varied from several seconds in hot water up to 5 minutes in cold water.

Alternatively, the food products were expanded in a steam atmosphere and in hot oil. In each case, the product expanded to its original size and geometry.

EXAMPLE 2

A similar food product but of higher density than that of Example 1 was made, according to the following recipe:

| Component | % (Weight) |
| --- | --- |
| Gluten | 24 |
| Soy protein (Promine D) | 7 |
| Propylene glycol | 6 |
| Meat | 18 |
| Water | 45 |

The mixing and preparation procedures were the same as those described in Example 1. The product was compressed under 2,000 psi. pressure, resulting in a size reduction of 2.5 to one. On rehydration and expansion, a chewy meat product was obtained suitable for pet food.

EXAMPLE 3

Compressed meat products prepared as in Example 1 with a moisture content of 5 percent were coated with ice so that upon thawing the moisture content of the product increased to 40 percent. The specimens were frozen to 0° F. and then dipped in ice water. The operation was continued until a desired amount of ice coated each specimen. The products can be stored indefinitely in a freezer and upon thawing, either at room temperature or in a low oven, the specimens expanded to their original form and shape in periods of time varying from 1 to 5 minutes, depending upon the size of the sample and the thawing temperature.

EXAMPLE 4

This example describes a meat product which upon immersion in liquids is capable of leaching gravy while expanding to its original size and shape. The recipe used is the one given in Example 2. A water-soluble food color was first dissolved in the water at a level of 0.00625 grams per 100 grams of water. In addition, a lake shade color was dispersed in the propylene glycol at a level of 1 gram of color per 100 grams of propylene glycol.

The preparation, mixing and compression of the food products were the same as described in Example 1. An instant gravy powder mix (clear-gel type) was applied to the final compressed product as follows: The food products were sprayed with hydrogenated fat at a temperature just above the melting point of the fat (55° C.). Alternatively, the food products can be dipped into the molten fat and quickly cooled. The fat-coated samples were then rolled in the gravy mix and the gravy powder thus coated on the outer surface of the food products specimens. When these products were immersed in hot liquid, there was a dissolution of the gravy in the liquid coupled with expansion of the sample to its original size and form.

EXAMPLE 5

A food product similar to that described in Example 1 was made but edible cellulose fiber was substituted for the meat. The fiber contributes both to the mouth feel texture of the product and to the maintenance of its structural integrity during compression. The recipe is as follows:

| Component | % (Weight) |
|---|---|
| Cellulose fiber | 5 |
| Glycerine | 10 |
| Nonfat dry milk solids | 15 |
| Gluten | 40 |
| Promine D | 30 |

One part of this mixture was combined with two parts of water in preparing the product.

EXAMPLE 6

A product prepared similar to Example 1 but not containing any meat or other fibrous material was made according to the following recipe:

| Component | % (Weight) |
|---|---|
| Gluten | 50 |
| Promine D | 32 |
| Nonfat dry milk solids | 10.5 |
| Propylene glycol | 7.5 |

One part of this mixture was added to two parts of water in preparing the product.

We claim:

1. A compounded food product comprising comminuted meat, fish or vegetable containing at least 18 percent vegetable protein by weight of the food product and at least 10 percent by weight of the food product of a compound selected from the group consisting of edible polyhydric alcohol, mono-glyceride, and di-glyceride, admixed therewith to form a doughy mass which is cooked, then dried to a moisture content of about 4 to 8 percent by weight of the food product, compressed to about 10 to 50 percent of the original volume, and dried to a moisture content not greater than 3 percent by weight of the food product, which on admixture with an aqueous liquid is restored to its original volume, geometry and structure.

2. A food product as defined by claim 1 wherein the comminuted food is meat.

3. A food product as defined by claim 2 wherein the comminuted food is beef.

4. A food product as defined by claim 3 wherein the polyhydric alcohol is glycerol.

5. A food product as defined by claim 4 wherein the vegetable protein is gluten.

6. A method of producing a compressed food product which, on admixture with aqueous liquid, is restored to its original volume, geometry and structure, which comprises the steps of
   a. comminuting meat, fish or vegetable,
   b. adding thereto at least 18 percent vegetable protein by weight of the food product and 10 percent by weight of the food product of a compound selected from the group consisting of edible polyhydric alcohol, mono-glyceride, and di-glyceride, the percentages being calculated on the total weight of the ingredients of the food product,
   c. cooking the product at the temperature and time customarily used for the original food ingredient,
   d. drying the cooked food product to about 4 to 8 percent moisture by weight,
   e. compressing the dried food product to about 10 to 50 percent of its original volume, and
   f. drying said compressed food product to a moisture content not exceeding 3 percent by weight of the food product.

7. The method of claim 6 wherein the comminuted food is meat.

8. The method of claim 7 wherein the comminuted meat is beef.

9. The method of claim 6 wherein the polyhydric alcohol is glycerol.

10. The method of claim 6 wherein the vegetable protein is gluten.

* * * * *